(12) United States Patent
Shimizu

(10) Patent No.: US 7,551,184 B2
(45) Date of Patent: Jun. 23, 2009

(54) INFORMATION PROCESSING APPARATUS AND INFORMATION PROCESSING METHOD, AND PROGRAM

(75) Inventor: Wataru Shimizu, Kawasaki (JP)

(73) Assignee: Canon Kabushiki Kaisha, Tokyo (JP)

(*) Notice: Subject to any disclaimer, the term of this patent is extended or adjusted under 35 U.S.C. 154(b) by 390 days.

(21) Appl. No.: 11/462,524

(22) Filed: Aug. 4, 2006

(65) Prior Publication Data

US 2007/0030293 A1 Feb. 8, 2007

(30) Foreign Application Priority Data

Aug. 8, 2005 (JP) ............................. 2005-230089

(51) Int. Cl.
G09G 5/00 (2006.01)
G06F 3/00 (2006.01)
G06F 3/048 (2006.01)

(52) U.S. Cl. ................... 345/629; 345/619; 345/156; 345/1.1; 345/9; 715/700; 715/838; 715/855; 715/859

(58) Field of Classification Search ............... 345/581, 345/591, 619, 629–630, 661, 156, 157–173, 345/551, 1.1, 9; 715/700, 815, 798–800, 715/838, 855, 856–860

See application file for complete search history.

(56) References Cited

U.S. PATENT DOCUMENTS

| 2004/0021790 | A1* | 2/2004 | Iga ........................ 348/333.12 |
| 2005/0036173 | A1* | 2/2005 | Hayashi et al. ............... 358/2.1 |
| 2005/0278636 | A1* | 12/2005 | Nomoto ..................... 715/724 |
| 2007/0030293 | A1 | 2/2007 | Shimizu ..................... 345/668 |
| 2007/0171238 | A1* | 7/2007 | Ubillos et al. ............... 345/648 |
| 2007/0198638 | A1* | 8/2007 | Omura et al. ............... 709/204 |

FOREIGN PATENT DOCUMENTS

JP 8-292870 11/1996

* cited by examiner

*Primary Examiner*—Wesner Sajous
(74) *Attorney, Agent, or Firm*—Fitzpatrick, Cella, Harper & Scinto

(57) ABSTRACT

There is disclosed a highly convenient user interface which can suitably perform enlarged display of a designated object and suitably allow the user to operate original objects occluded under the object which undergoes the enlarged display or the like. An arbitrary position on a reduced image displayed on a screen of a display unit is designated using a pointer. A pointer sensing unit determines whether or not the designated position falls within the display range of the reduced image, and an enlarged image corresponding to the reduced image is displayed at a position according to the designated position of the pointer within that region.

14 Claims, 16 Drawing Sheets

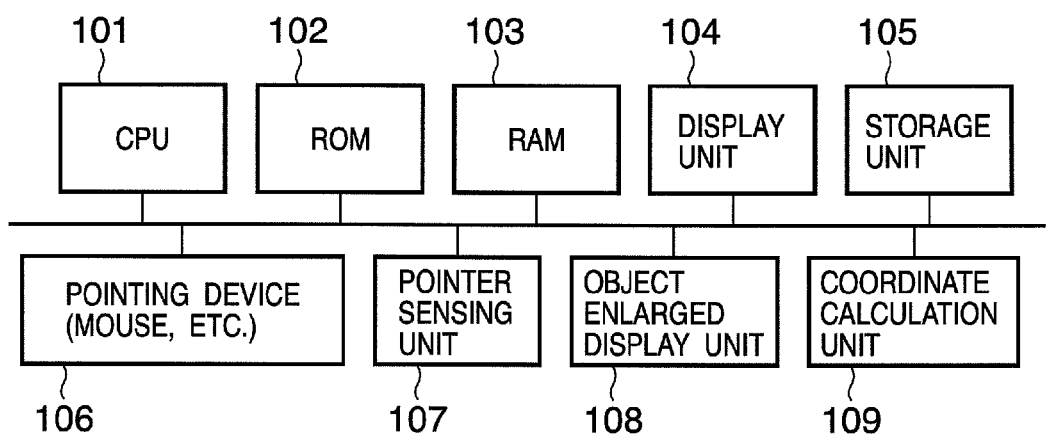
F I G. 1

FIG. 10

|  | CHANNEL A | CHANNEL B | CHANNEL C | CHANNEL D |
|---|---|---|---|---|
| 18 | 18:00 NEWS A | 18:00 COOKING | 18:00 DRAMA A | 18:00 CINEMA |
|  |  | 18:30 LEARNING MATH |  |  |
| 19 | 19:00 NEWS B | 19:00 LEARNING SPANISH | 19:00 DRAMA B | 19:00 BASEBALL GAME |
| 20 | 20:00 NEWS C | 20:00 LEARNING FRENCH | 20:00 DRAMA C |  |

FIG. 12

| | CHANNEL A | CHANNEL B | CHANNEL C | CHANNEL D |
|---|---|---|---|---|
| 18 | 18:00 NEWS A | 18:00 COOKING | 18:00 DRAMA A | 18:00 CINEMA |
| | | 18 LE MA | 19:00 DRAMA B TITLE "XXXOO" CAST: JACK APPLE, CATHY PEACH PRODUCER: MICHEL ORANGE SCRIPT: ROBERT STRAWBERRY | |
| 19 | 19:00 NEWS B | 19 LE SP | | |
| 20 | 20:00 NEWS C | 20 LE FR | | |

1202 (table), 1201 (popup)

FIG. 15

| | CHANNEL A | CH... | | ...D |
|---|---|---|---|---|
| 18 | 18:00 NEWS A | 18... CO... 18... LE... MA... | 1501 — 19:00  DRAMA B  TITLE "XXXOO"  CAST: JACK APPLE, CATHY PEACH  PRODUCER: MICHEL ORANGE  SCRIPT: ROBERT STRAWBERRY | |
| 19 | 19:00 NEWS B | 19:00 LEARNING SPANISH | •A   C•   •B | 19:00 BASEBALL GAME |
| 20 | 20:00 NEWS C | 20:00 LEARNING FRENCH | 20:00 DRAMA C | |

FIG. 16

| | CHANNEL A | CHANNEL B | CHANNEL C | CHANNEL D |
|---|---|---|---|---|
| 18 | 18:00 NEWS A | 18:00 COOKING | 18:00 DRAMA A | 18:00 CINEMA |
| | | 18:30 LEARNING MATH | | |
| 19 | 19:00 NEWS B | 19:00 LEARNING SPANISH | •A C• •B | 19:00 DRAMA B |
| 20 | 20:00 NEWS C | 20:00 LEARNING FRENCH | 20:00 DRAMA C | |

1601

19:00

DRAMA B

TITLE "XXXOO"

CAST : JACK APPLE, CATHY PEACH

PRODUCER : MICHEL ORANGE

SCRIPT : ROBERT STRAWBERRY

INFORMATION PROCESSING APPARATUS AND INFORMATION PROCESSING METHOD, AND PROGRAM

BACKGROUND OF THE INVENTION

1. Field of the Invention

The present invention relates to an information processing apparatus, an information processing method, which display a thumbnail image displayed on a screen in an enlarged scale, and a program.

2. Description of the Related Art

In recent years, various information processing apparatuses are required to have effective display and selection methods of various kinds of information such as images and the like. For example, upon selecting a photo taken by a digital camera, it is a common practice to adopt a method of displaying thumbnail images (reduced images) of a plurality of photos side by side on the screen, and selecting one of them using a pointing device such as a mouse or the like. Also, in addition to images, a method of displaying a list of programs upon viewing of a television or video recording, and selecting a program from them is prevalently used.

However, when objects such as images and the like are reduced and a list of these objects is displayed, sufficient information cannot be displayed intact. Hence, the selected object is temporarily enlarged on the screen, or detailed information is independently displayed, thus improving user's convenience.

As such a technique, a method of displaying an object present at the position pointed by a pointing device in an enlarged scale is known. For example, this method is disclosed in Japanese Patent Laid-Open No. 8-292870.

However, with the above method, other objects are occluded by the enlarged object, and the user can neither visually confirm nor select occluded objects.

To solve this problem, a method of separately displaying a reduced object list display area and an enlarged object display area on the screen, and displaying, when one reduced object is selected, a corresponding enlarged object on the enlarged object display area is also available. However, with such method of distinguishing the object display areas, the reduced object list display area becomes narrow from the very beginning, and the user can hardly select objects displayed in that area.

For this reason, conventionally, it is a common practice to display an enlarged object at the same position as that of an original reduced object or always at the center of the screen even when some reduced objects are occluded.

SUMMARY OF THE INVENTION

The present invention has been made in consideration of the above situation, and has as its object to provide a highly convenient user interface which can suitably perform enlarged display of a designated object and suitably allow the user to operate original objects occluded under the object which undergoes the enlarged display or the like.

According to the present invention, the foregoing object is attained by providing an information processing apparatus comprising:

a storage unit adapted to store a first object and a second object corresponding to the first object;

a first display unit adapted to display the first object;

a second display unit adapted to display the second object;

a designation unit adapted to designate an arbitrary position of an object using an index; and a determination unit adapted to determine whether or not the position designated by the index on a screen falls within a display region of the first object while the second object is not displayed, wherein when the determination unit determines that the designated position of the index by the designation unit has moved within the display region of the first object, the second display unit newly re-displays the second object to be superimposed on the first object at a position corresponding to the designated position of the index after movement and the display position of the first object.

According to the second aspect of the present invention, the foregoing object is attained by providing an information processing method for a display apparatus which stores a first object and a second object corresponding to the first object, and can superimpose the first object and the second object on a screen, comprising:

a first display step of displaying the first object;

a second display step of displaying the second object;

a designation step of designating an arbitrary position of an object using a index; and a determination step of determining whether or not the position designated by the index on a screen falls within a display region of the first object while the second object is not displayed, wherein the second display step includes: newly re-displaying, when it is determined in the determination step that the designated position of the index has moved within the display region of the first object, the second object to be superimposed on the first object at a position corresponding to the designated position of the index after movement and the display position of the first object.

According to the third aspect of the present invention, the foregoing object is attained by providing a program for making a display apparatus, which stores a first object and a second object corresponding to the first object, and can superimpose the first object and the second object on a screen, execute:

a first display procedure of displaying the first object;

a second display procedure of displaying the second object;

a designation procedure of designating an arbitrary position of an object using a index; and a determination procedure of determining whether or not the position designated by the index on a screen falls within a display region of the first object while the second object is not displayed, wherein the second display procedure includes: newly re-displaying, when it is determined in the determination procedure that the designated position of the index has moved within the display region of the first object, the second object to be superimposed on the first object at a position corresponding to the designated position of the index after movement and the display position of the first object.

Further features of the present invention will become apparent from the following description of exemplary embodiments with reference to the attached drawings.

BRIEF DESCRIPTION OF THE DRAWINGS

FIG. 1 is a block diagram showing the arrangement of an information processing apparatus which displays objects according to the first embodiment of the present invention;

FIG. 10 is a view showing an example of the electronic program guide which is generated by a program guide generation unit 910 shown in FIG. 9 and is displayed on a display unit 904;

FIG. 12 is a view showing an example of enlarged data displayed when a pointer points to the interior of a region of program data;

FIG. 15 is a view showing the display position of enlarged data when the pointer is moved downward (the positive direction of the Y-axis); and FIG. 16 is a view showing the display position of enlarged data when the pointer is moved leftward (the negative direction of the X-axis).

DESCRIPTION OF THE EMBODIMENTS

Figure 2:
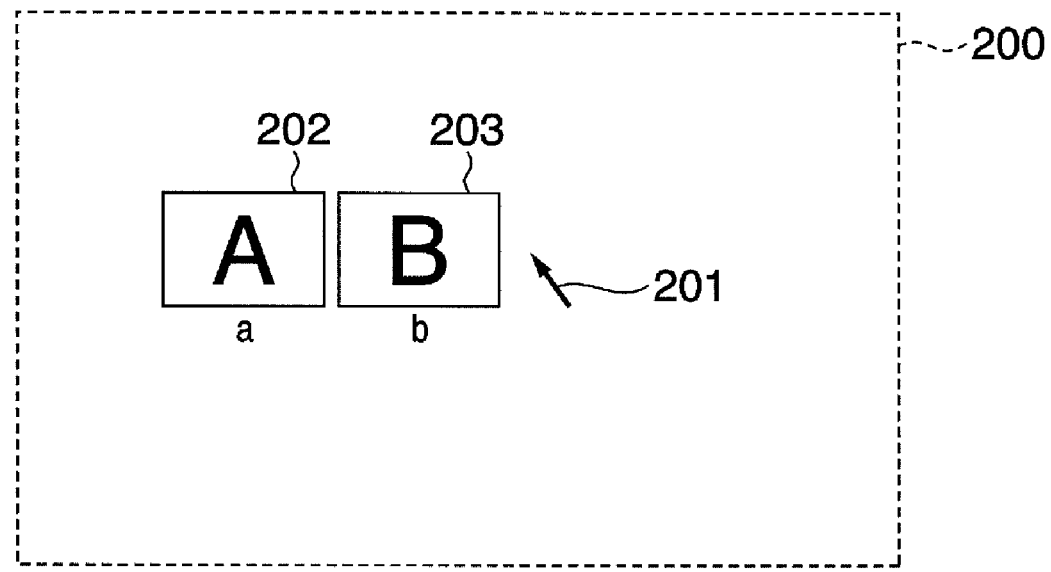
FIG. 2 shows an example of objects displayed on a display screen 200 of a display unit 104 of the information processing apparatus shown in FIG. 1.

Preferred embodiments of the present invention will now be described in detail with reference to the drawings. It should be noted that the relative arrangement of the components, the numeral expressions and numerical values set forth in these embodiments do not limit the scope of the present invention unless it is specifically stated otherwise.

First Embodiment

FIG. 1 is a block diagram showing the arrangement of an information processing apparatus which displays objects according to the first embodiment of the present invention. Referring to FIG. 1, a CPU 101 serves as a system control unit and controls the overall apparatus. A ROM 102 stores control programs of the CPU 101 and various kinds of permanent data. A RAM 103 comprises an SRAM, DRAM, or the like, and stores program control variables and the like. Also, the RAM 103 stores various setting parameters, various work buffers, and the like.

A display unit 104 has a display screen such as a liquid crystal monitor or the like, and can display objects such as images, text, and the like, and GUI information. A storage unit 105 comprises a hard disk or the like, and stores file data of thumbnail images (reduced images) as display objects before enlargement, original images (to be referred to as "enlarged images" hereinafter) of the thumbnail images as display objects after enlargement, and the like. A pointing device 106 includes a mouse, touch panel, or the like, and is used to point to one point on the display screen of the display unit 104. A pointer sensing unit 107 senses a position (coordinates) on the screen pointed by the pointing device 106. An object enlarged display unit 108 enlarges a display object and displays an enlarged display object at an arbitrary location. A coordinate calculation unit 109 calculates the coordinates of a location where the enlarged display object is to be displayed based on the coordinates of the object and those pointed by a pointer.

FIG. 2 shows an example of objects displayed on a display screen 200 of the display unit 104 of the information processing apparatus shown in FIG. 1. Referring to FIG. 2, objects 202 and 203 are thumbnail images (reduced images) of original enlarged images. Also, the object 202 displayed at the left side on the screen will be referred to as image a, and the object 203 displayed at the right side on the screen will be referred to as image b. Note that the number of image objects is not limited to two, and image objects are assumed to be laid out at right, left, up, and down positions. However, this embodiment describes two image objects which are related to the operation of the pointing device 106. In FIG. 2, reference numeral 201 denotes a pointer which points to a position pointed by the pointing device 106. The user operates the pointer 201 using the pointing device 106. In this embodiment, the pointer 201 is located at the right side of images a and b as an initial position, as shown in FIG. 2.

Figure 3:
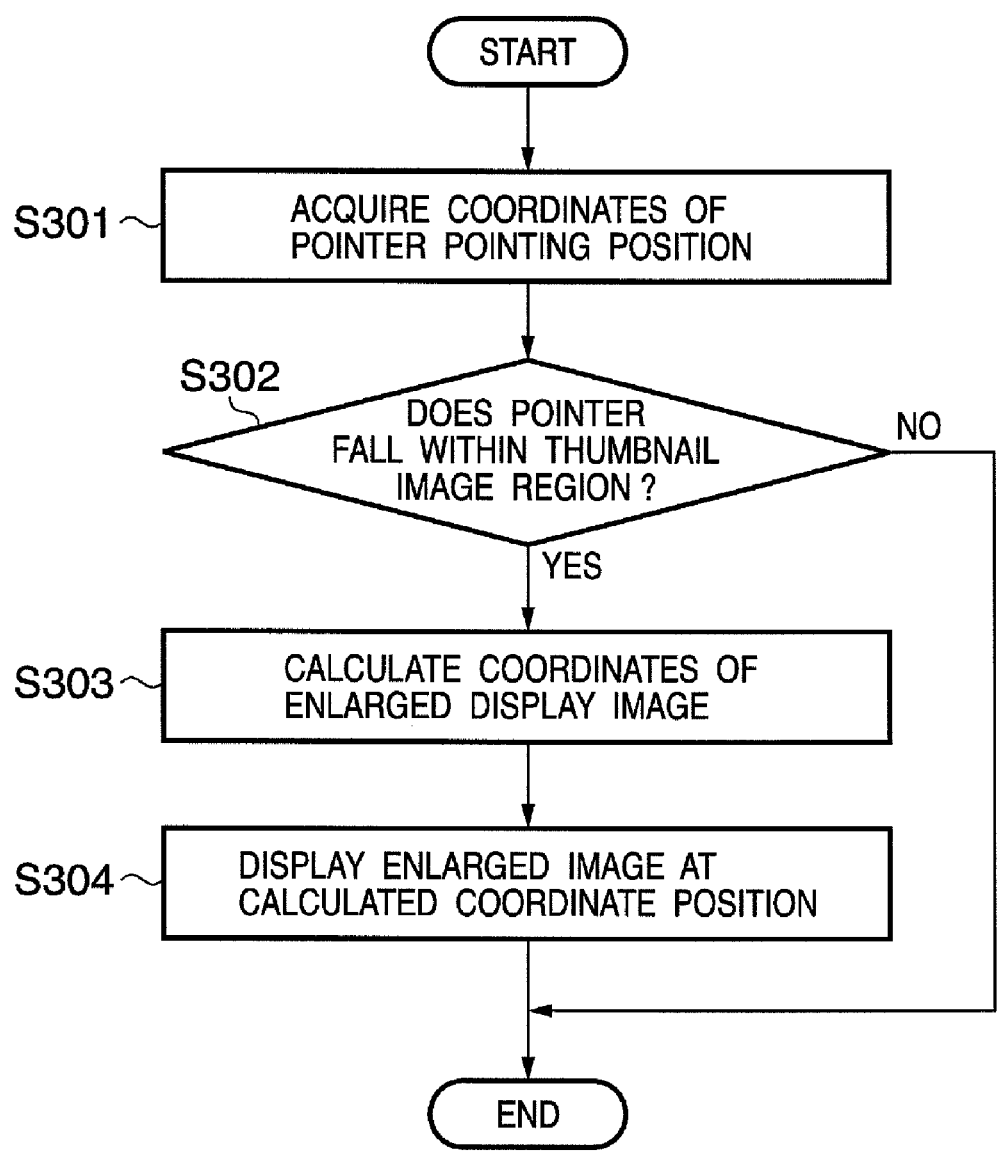
FIG. 3 is a flowchart for explaining the processing operation of the information processing apparatus according to the first embodiment of the present invention.

FIG. 3 is a flowchart for explaining the processing operation of the information processing apparatus according to the first embodiment of the present invention. The pointer sensing unit 107 acquires the coordinates of a position pointed by the pointer 201 on the display screen 200 (step S301). Note that this processing is done for every sensing event of movement of the pointer 201 by the pointer sensing unit 107. It is checked if the pointer 201 is located within the display region of the thumbnail image (image a or b in this example) (step S302). As a result, if the pointer 201 is located within the display region (Yes), the flow advances to step S303; otherwise (No), this processing ends. In the example shown in FIG. 2, since the pointer 201 is located outside the display region of the thumbnail image, the processing ends.

Figure 4:
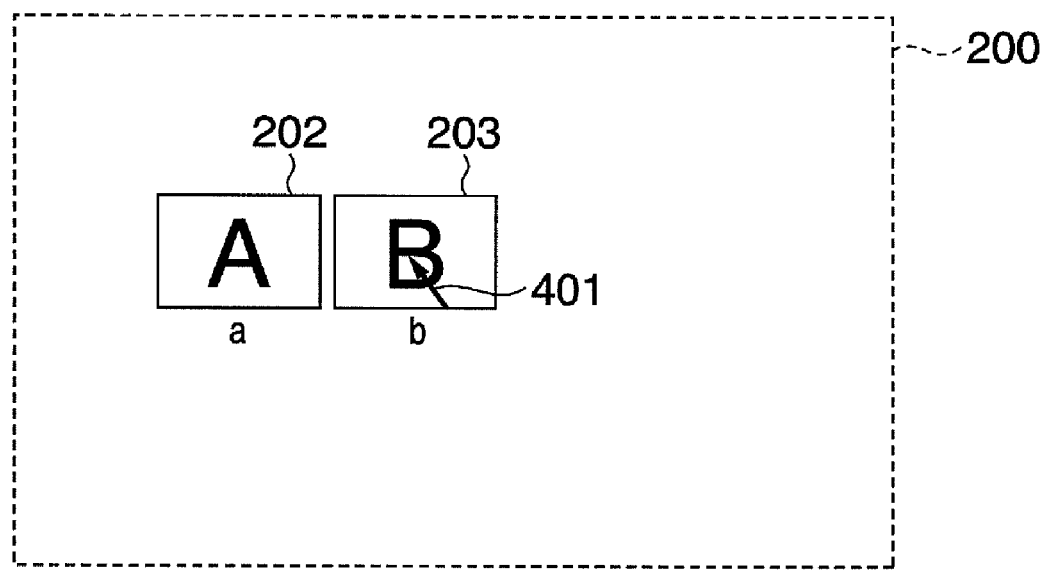
FIG. 4 is a view showing a state when a pointer is moved from the state shown in FIG. 2 into an object region.
Figure 5:
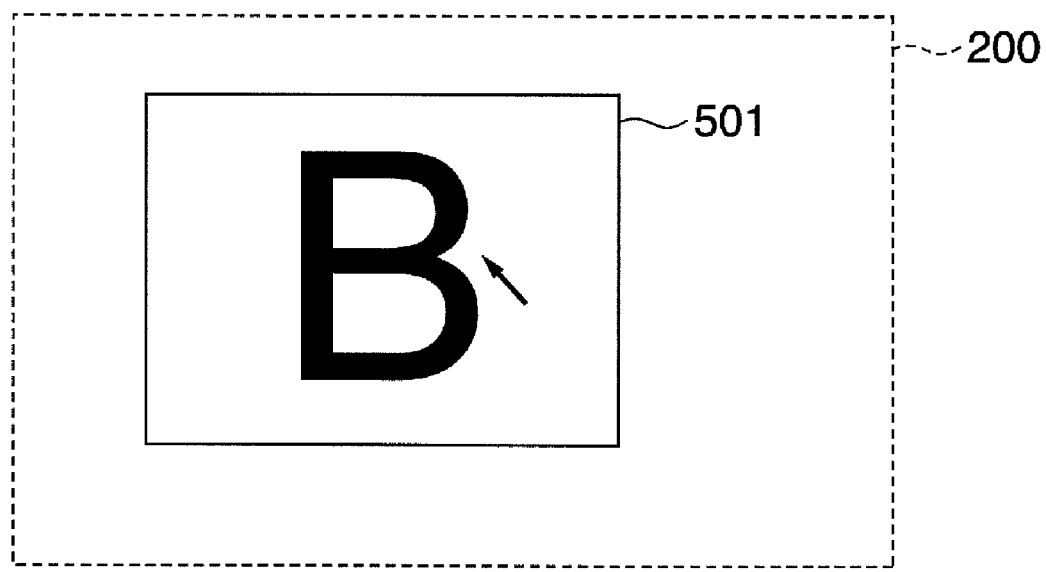
FIG. 5 is a view showing a state wherein image B (501) obtained by enlarging a thumbnail image 203 (image b) is displayed on the display screen 200.

Assume that the user moves the pointer from the position of the pointer 201 in FIG. 2 to a position of a pointer 401 in FIG. 4. FIG. 4 shows a state wherein the pointer is moved from the state shown in FIG. 2 into an object region. In case of the state shown in FIG. 4, it is determined in step S302 that the pointer 401 is located within the display region of the thumbnail image 203 (image b) (Yes). Then, the display position of an enlarged display image is calculated based on the pointing position of the pointer 401 and the position of the thumbnail image (step S303). Note that details of this calculation processing will be described later. Based on the calculation result, as shown in FIG. 5, an image B object as an enlarged image of image b is displayed as an image of the uppermost layer on the display screen 200 (step S304). FIG. 5 shows a state wherein image B (501) obtained by enlarging the thumbnail image 203 (image b) is displayed on the display screen 200.

The display position of image B is calculated not to occlude image a when image B is displayed in an enlarged scale. As a coordinate calculation algorithm used in the calculation processing by the coordinate calculation unit 109 in step S303, various methods may be used. Hence, this embodiment adopts the following method. That is, a relative position of the pointing position of the pointer within the display region of the thumbnail image (e.g., image b) displayed on the display screen 200 is determined. An image is naturally displayed in an enlarged scale at the position of the pointer in synchronism with the user's pointer operation, while image a is prevented from being occluded when the pointer operation approaches image a. Then, the enlarged image (e.g., image B) is displayed so that the relative position matches that of the pointing position of the pointer within the display region of the image (e.g., image B) obtained b enlarging the thumbnail image of interest. Details of this method will be described below.

Figure 6:
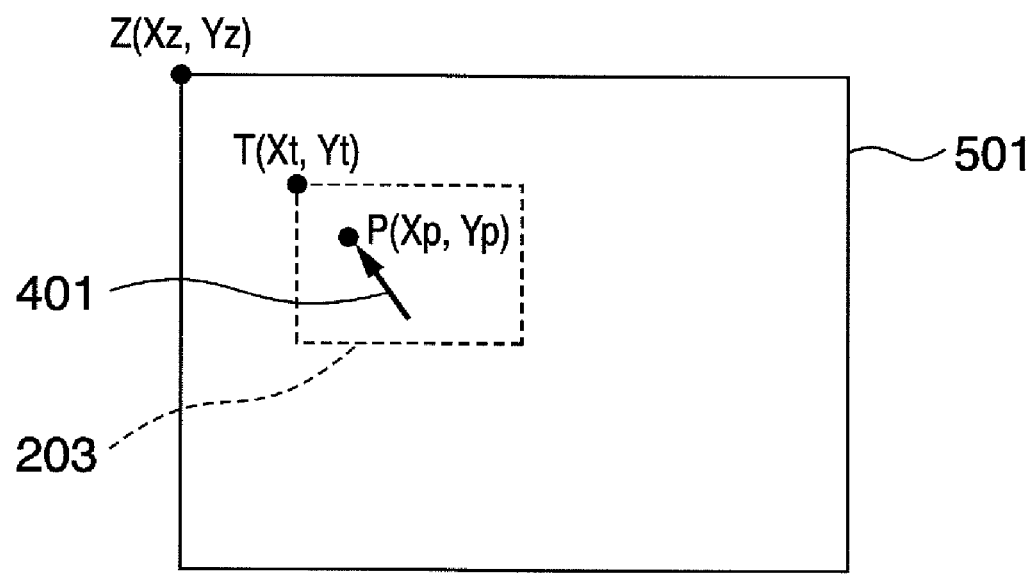
FIG. 6 is a view showing a coordinate example of an object to explain a coordinate calculation algorithm in step S303 in the first embodiment.
Figure 7:
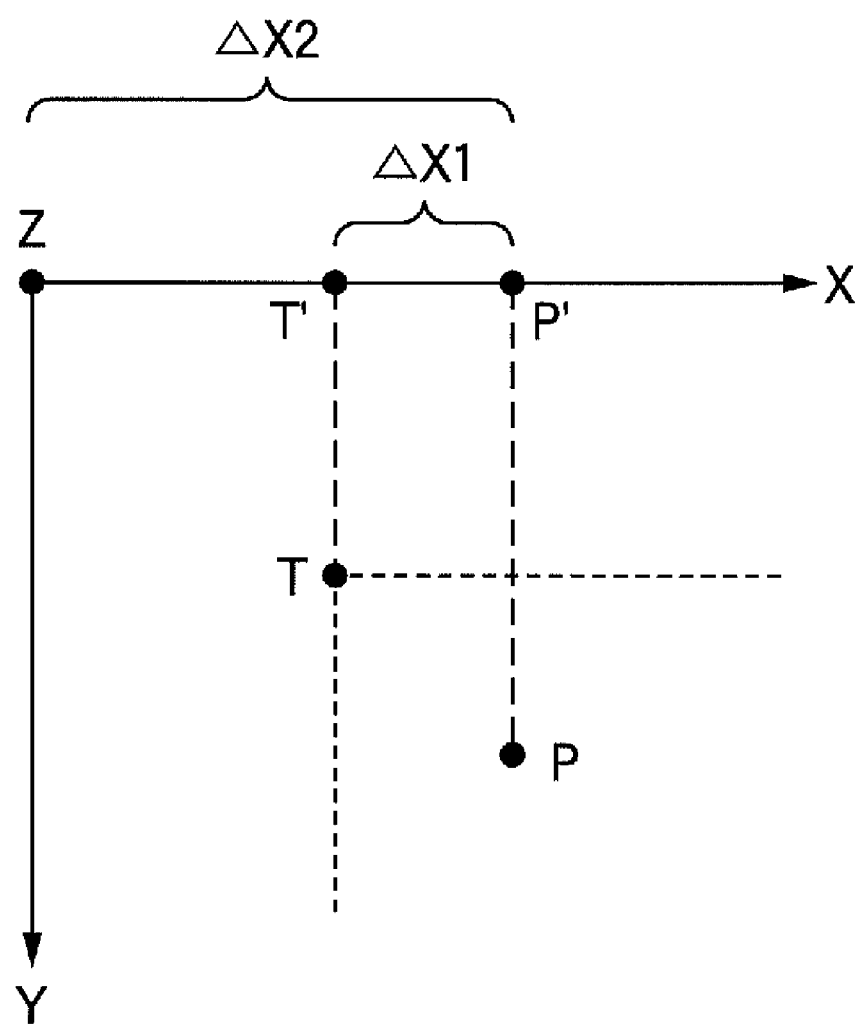
FIG. 7 is a view for explaining the coordinate calculation algorithm in step S303 in the first embodiment.

FIG. 6 is a view showing a coordinate example of an object to explain the coordinate calculation algorithm in step S303 in the first embodiment. FIG. 7 is a view for explaining the coordinate calculation algorithm in step S303 in the first embodiment. As shown in FIG. 6, let a point T(Xt, Yt) be the upper left position of the thumbnail image 203 (image b), a point P(Xp, Yp) be the pointing position of the pointer 401, n be the enlargement ratio of the image, and a point Z(Xz, Yz) be the upper left corner of the enlarged image 501. Furthermore, let T' and P' be the intersections between perpendiculars dropped from the points T and P to the horizontal side (the side in the X-axis direction) extending from the point Z of the enlarged image 501, and that horizontal side. Also, let ΔX1 be the T'–P' distance, and ΔX2 be the Z–P' distance. Note that the right side of the horizontal direction (X-axis direction) and the down side of the vertical direction (Y-axis direction) are positive directions.

In this case, according to the coordinate calculation algorithm of this embodiment, we have:

ΔX1:ΔX2=1:n

Hence, the X-coordinate Xz of the point Z is given by:

Xz=Xt−(Xp−Xt)×(n−1)

Likewise, the Y-coordinate Yz of the point Z is given by:

Yz=Yt−(Yp−Yt)×(n−1)

Figure 8A:
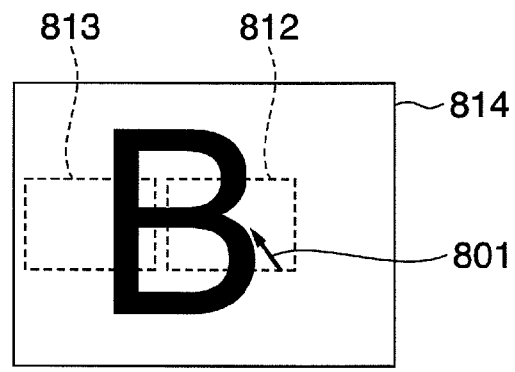
FIGS. 8A to 8E are views showing an example of the relationship between the pointer and enlarged images when the coordinate calculation algorithm according to the first embodiment of the present invention is applied.

FIGS. 8A to 8E show an example of the relationship between the pointer and enlarged image when the coordinate calculation algorithm according to the first embodiment of the present invention is applied. In FIG. 8A, a pointer 801 points to a position somewhat at the right side of the center of the display region of a reduced image 812. Therefore, the pointer 801 also points to a position somewhat at the right side of the center of an enlarged image 814 of the reduced image 812 on the enlarged image 814.

Figure 8B:
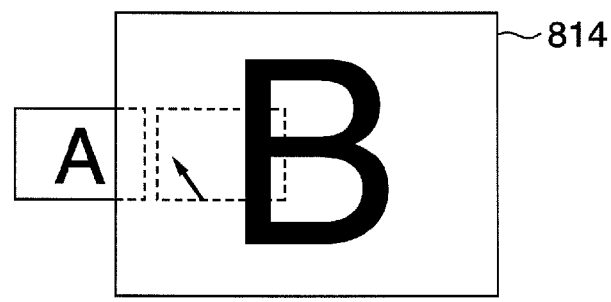

In FIG. 8B, since the pointer 801 is moved leftward from the state of FIG. 8A and is located at the left side of the center of the reduced image 812, the enlarged image 814 is moved rightward from the state of FIG. 8A. Then, in FIG. 8C, the pointer 801 is moved to be located at the left end of the reduced image 812. In this case, the pointer 801 also points to the left end of the enlarged image 814.

Figure 8C:
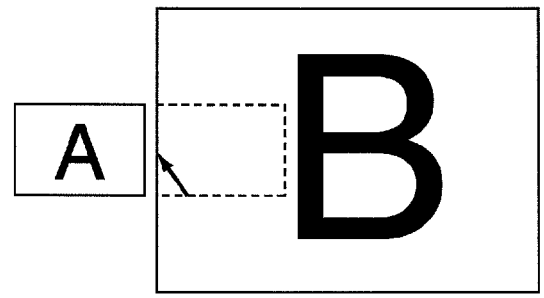
Figure 8D:
Figure 8E:
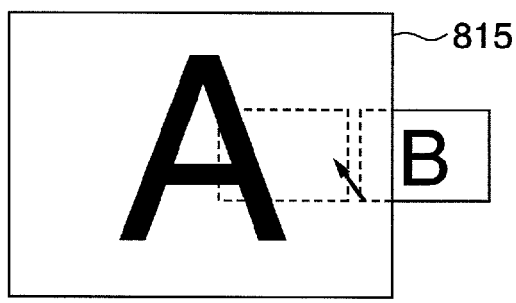

In FIG. 8D, the pointer 801 is moved to a part (e.g., a background part on the screen) which is not on the reduced image between the reduced image 812 and a reduced image 813, and is not located within either region. For this reason, no enlarged image is displayed. In FIG. 8E, since the pointer 801 is moved into the region of the reduced image 813, an enlarged image 815 of the reduced image 813 is displayed. Upon displaying the enlarged image, the relative position of the pointing position pointed by the pointer matches that between the reduced image and pointer.

In this way, for example, even when the reduced image 812 is displayed in an enlarged scale first, and the reduced image 813 is then enlarged, they can be displayed by simply moving the pointer 801 from the right side to the left side on the display screen 200. That is, the need for, e.g., clicking of a mouse to instruct enlarged display or to cancel the displayed image is obviated. Since the display position of the enlarged image on the screen corresponds to the position of the pointer on the thumbnail image, a UI which can display, e.g., an enlarged image like intuitive operations by the user can be provided.

Note that the algorithm for determining the display position of an enlarged image need not always follow the above description, and can be changed according to use applications.

Also, the object whose display position is changed need not always be an enlarged object, and an algorithm that moves a reduced image occluded upon displaying an enlarged image may be adopted.

Furthermore, when an image partially falls outside the display screen as a result of enlarged display, another processing can be executed. That is, when a thumbnail image (reduced image) is enlarged, since its display position is determined based on the relative position, as described above, the left side of an enlarged object may fall outside the screen. For example, when the pointer 801 is located on the left side of the reduced image 812, as shown in FIG. 8C, the enlarged image 814 may be forcibly moved leftward to a position where it is fully displayed. Note that the method of applying the aforementioned algorithm even in such case when the pointer 801 is located at the right side of the reduced image 812 is also available. Alternatively, processing for scrolling the entire screen rightward as well as reduced images which are immovable in the aforementioned processing so as to prevent the enlarged image from partially falling outside the screen may be used.

Upon enlarging a reduced object, an image with an original size to that enlarged to a predetermined size may be continuously displayed, thus simultaneously and continuously performing position change and enlarged display of the object.

In this embodiment, a reduced object designated by the pointer is displayed in an enlarged scale. When an object is a character string, the number of pieces of information to be displayed may be increased such that only first several characters are displayed in case of reduced display, and more characters are displayed in case of enlarged display.

At the boundary of the object region, a resistance may be imposed to the operation of the pointer so that it is hard to fall outside the region.

Furthermore, when the user makes an operation to move the pointer from the interior of the object region to the exterior of the region using the pointing device 106, the pointing position of the pointer may not be changed, and when the user moves the pointer beyond movement of a given threshold, the pointer may be moved outside the region. With this control, even when the user inadvertently and largely moves a mouse or the like, display itself of an electronic program guide remains unchanged, and only when a required operation is made, the display can be changed.

Moreover, the information processing apparatus according to this embodiment may comprise a setting unit which sets priority as to whether or not each object (image or the like) is to be enlarged, and an object to be enlarged may be selected according to the priority. Data with low priority may be set not to be enlarged even in case of an instruction of, e.g., passage of the pointer. Hence, even when the user makes a pointer operation on the data with low priority, that data is not enlarged, and he or she can point to target data without any stress. Also, a limitation may be set so that data with low priority is not enlarged unless it is pointed for a predetermined period of time or more.

According to this embodiment, a user interface which can suitably perform enlarged display of a designated object and suitably allow the user to operate original objects occluded under the object which undergoes the enlarged display or the like can be provided.

Second Embodiment

A display apparatus according to the second embodiment of the present invention will be described below. The second embodiment will explain an information processing apparatus which comprises a display screen that displays information of a program, detailed information of which is to be known, of an electronic program guide of a television.

Figure 9:
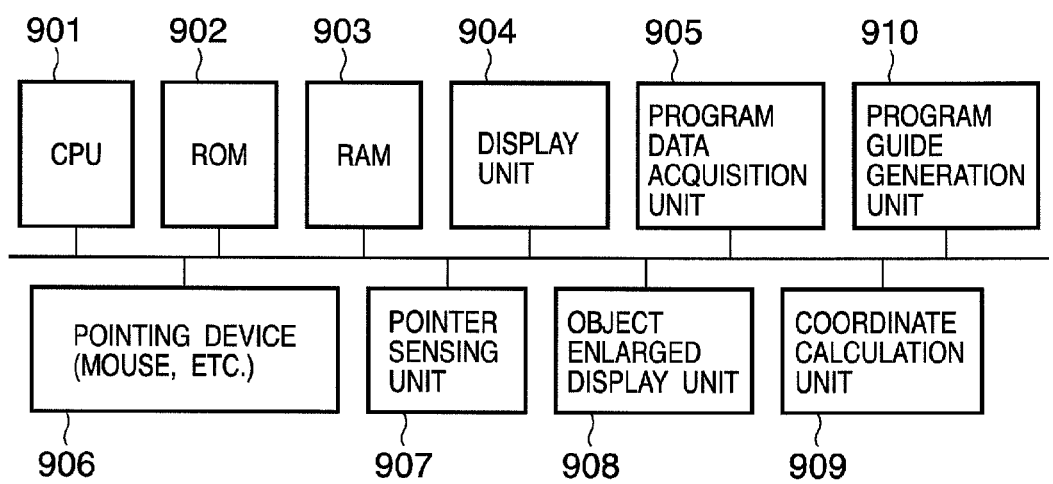
FIG. 9 is a block diagram showing the arrangement of an information processing apparatus which displays detailed information (object effect) of an electronic program guide according to the second embodiment of the present invention.

FIG. 9 is a block diagram showing the arrangement of an information processing apparatus which displays detailed information (object) of an electronic program guide according to the second embodiment of the present invention. Referring to FIG. 9, components 901 to 904 and 906 to 909 are the same as the components 101 to 104 and 106 to 109 in FIG. 1 as the building components of the display apparatus (information processing apparatus) according to the first embodiment described above, and a description thereof will be omitted.

Referring to FIG. 9, a program data acquisition unit 905 acquires program data each including a title of a television program, casts, and the like. For example, the program data acquisition unit 905 acquires such data via terrestrial television broadcasting or via the Internet. A program guide generation unit 910 generates a program guide to be displayed on the screen in practice based on the program data acquired by the program data acquisition unit 905.

FIG. 10 shows an example of an electronic program guide which is generated by the program guide generation unit 910 shown in FIG. 9 and is displayed on the display unit 904. The electronic program guide shown in FIG. 10 is configured by combining an axis 1001 that displays station names, an axis 1002 that indicates times, and a plurality of objects 1003 indicating program data.

It is normally difficult for such electronic program guide to display a list of detailed data of respective programs due to the size and resolution of the screen, an increase in number of channels, and the like. For this reason, in this embodiment, program data located at a position designated by the pointing device 906 is enlarged to display detailed program data, and the display position of the enlarged object is changed in synchronism with movement of the pointer.

Figure 11:
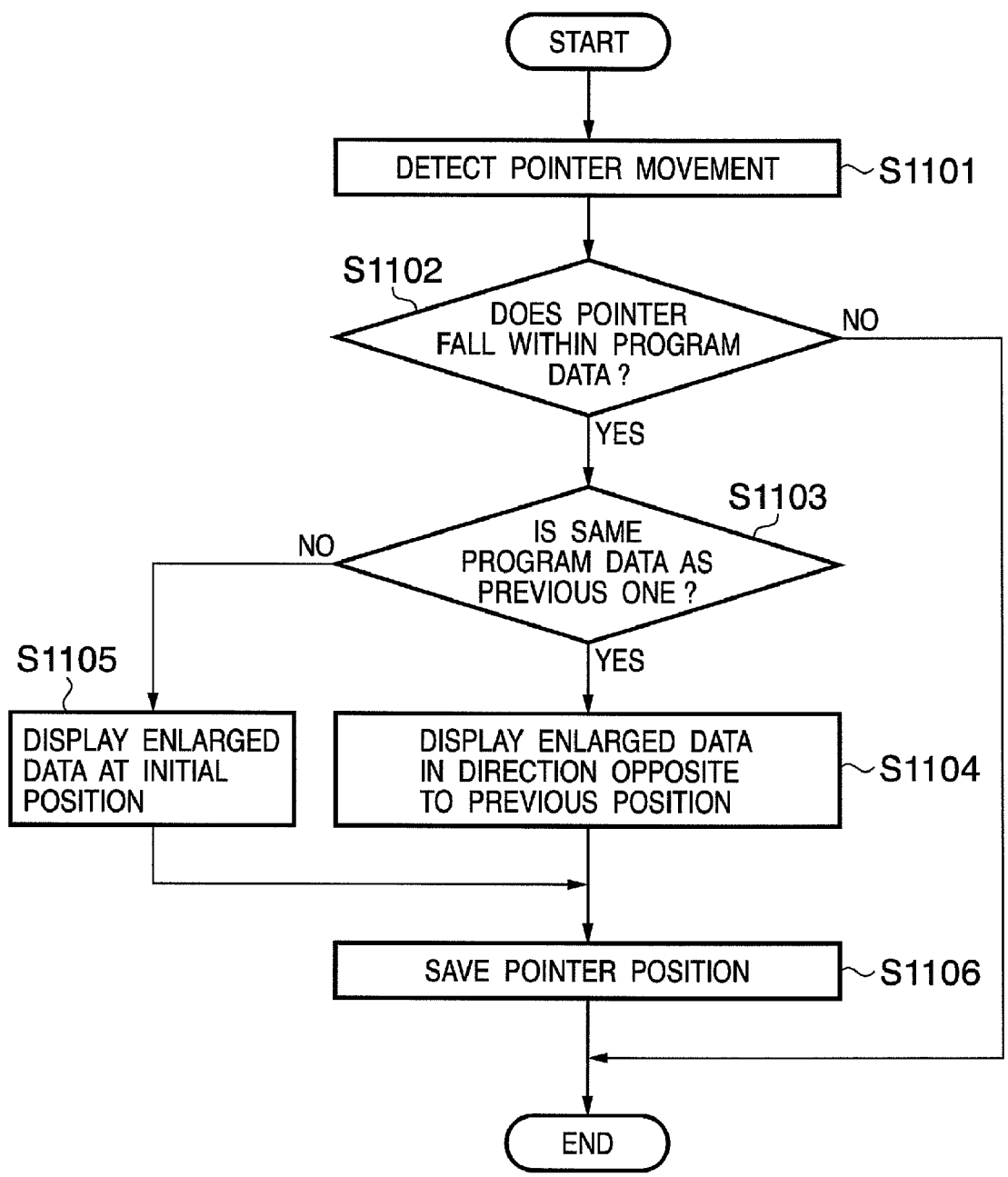
FIG. 11 is a flowchart for explaining the processing operation of the information processing apparatus according to the second embodiment of the present invention.

FIG. 11 is a flowchart for explaining the processing operation of the information processing apparatus according to the second embodiment of the present invention. When the pointing position of the pointer on the screen is moved by the pointing device 906, the pointer sensing unit 907 senses that movement (step S1101). It is checked if the pointer is located within program data (step S1102). As a result, if the pointer is located within the program data (Yes), it is checked if the program data of interest is the same as that which was enlarged upon detection of the previous movement (step S1103).

For example, when the pointer pointing position points to a program of a 19 o'clock zone of TV program C 1202 for the first time while there is no program data which is displayed in an enlarged scale, it is determined that the program data of interest is not the same as the previous program data (No). Hence, the object enlarged display unit 908 displays enlarged data 1201 at its initial position (step S1105). FIG. 12 shows an example of enlarged data when the pointer points to the interior of a region of program data. The enlarged data at that time is not the simply enlarged one of a reduced image but additionally includes detailed information that includes a subtitle, casts, and the like of a program. The initial position may be determined according to arbitrary rules (e.g., it is the same as that of original data). In this embodiment, an image is enlarged so that the central position of enlarged data matches that of original data, as shown in FIG. 12. After the enlarged data is displayed, the current pointing position of the pointer is saved (step S1106), thus ending this processing.

Figure 13:
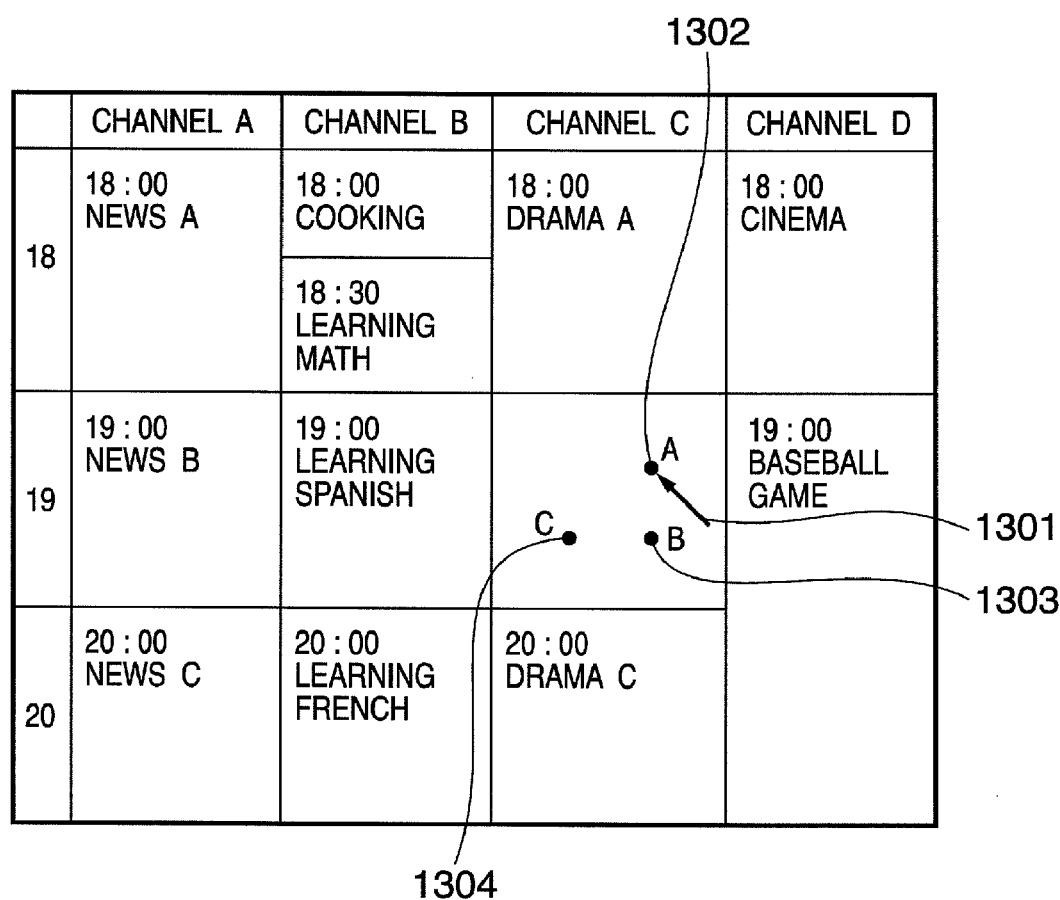
FIG. 13 is a view for explaining details of pointer movement in the second embodiment.

A case will be explained wherein the pointing position of the pointer is moved in the second embodiment. FIG. 13 is a view for explaining details of pointer movement in the second embodiment. Referring to FIG. 13, assume that a pointer 1301 is initially located at a position of point A (1302), and is moved to a position of point B (1303) and then to that of point C (1304). Note that in FIG. 13, display of program data of TV program C in the 19 o'clock zone is omitted for the sake of simplicity.

When the pointer is moved from point A to point B, the movement of the pointer is detected by the pointer sensing unit 907 (step S1101), and it is determined that the pointing position is located within the program data (Yes in step S1102). Since it is determined in step S1103 that the pointer is located within the same program data as that at the previous position (Yes), the enlarged data is moved to a direction opposite to the previous position and is displayed (step S1104).

Figure 14:
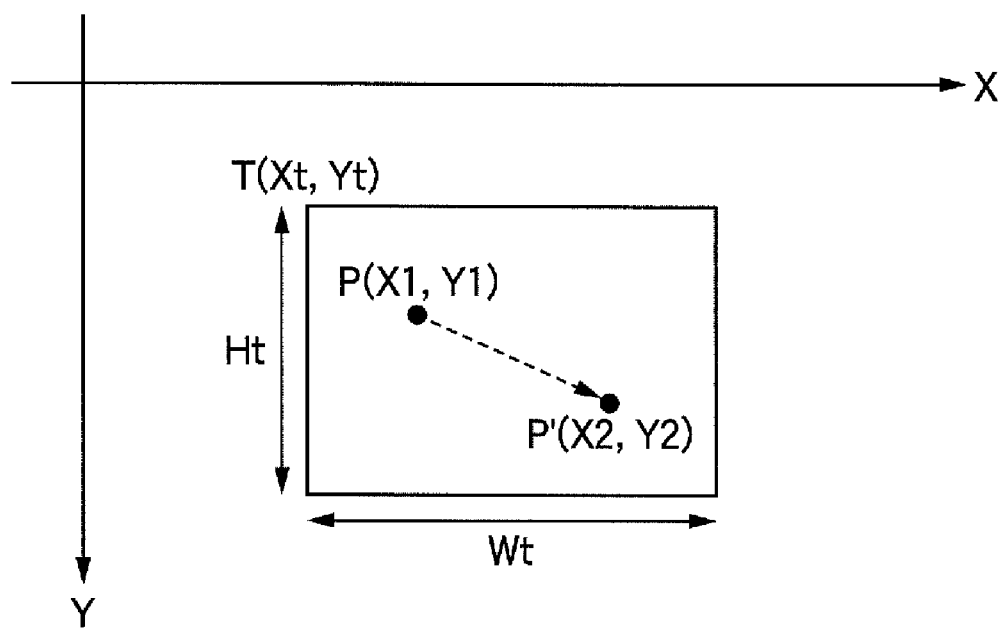
FIG. 14 is a view for explaining a coordinate calculation algorithm associated with enlarged display according to the second embodiment of the present invention.

An example of an enlarged data display position determination algorithm according to the processing in step S1104 will be described below. FIG. 14 is a view for explaining a coordinate calculation algorithm associated with enlarged display according to the second embodiment of the present invention. As shown in FIG. 14, let a point P(X1, Y1) be the position of the pointer before movement, and a point P'(X2, Y2) be the position after movement. Also, let a point T(Xt, Yt) be the upper left coordinates of the display position of program data, Wt be the width, and Ht be the height. Also, let Z(Xz, Yz) be the coordinates of enlarged data, Wz be the width, Hz be the height, and n be the enlargement ratio.

First, a moving distance $\Delta X = X2-X1$ of the pointer in the X-axis direction and a moving distance $\Delta Y = Y2-Y1$ in the Y-axis direction are calculated. As a result, when (the absolute value of $\Delta X$)>(the absolute value of $\Delta Y$) and $\Delta X>0$, it is determined that the pointer is moved rightward; when $\Delta X<0$, it is determined that the pointer is moved leftward. Likewise, when (the absolute value of $\Delta X$)<(the absolute value of $\Delta Y$) and when $\Delta Y>0$, it is determined that the pointer moved downward; when $\Delta Y<0$, it is determined that the pointer moved upward. The coordinates of the enlarged data are calculated using the following equations.

When the pointer is moved rightward, we have:

$Xz=Xt-Wz$ $Yz=Yt-((n-1)/2) \times Ht$

When the pointer is moved leftward, we have:

$Xz=Xt+Wt$ $Yz=Yt-((n-1)/2) \times Ht$

When the pointer is moved downward, we have:

$$Xz = Xt - ((n-1)/2) \times Wt$$

$$Yz = Yt - Hz$$

When the pointer is moved upward, we have:

$$Xz = Xt - ((n-1)/2) \times Wt$$

$$Yz = Yt + Hz$$

When the above calculation method is used, and when the pointer is moved from the position of point A to that of point B, enlarged data 1501 is displayed, as shown in FIG. 15. That is, FIG. 15 shows the display position of the enlarged data when the pointer is moved downward (positive direction of the Y-axis). In this case, the enlarged data 1201 shown in FIG. 12 is moved upward, i.e., in a direction opposite to the moving direction of the pointer by the user and is displayed like the enlarged data 1501 in FIG. 15.

On the other hand, when the pointer is further moved from point B to point C, enlarged data 1601 is displayed, as shown in FIG. 16. That is, FIG. 16 shows the display position of the enlarged data when the pointer is moved leftward (the negative direction of the X-axis). In this case, the enlarged data 1201 shown in FIG. 12 is moved rightward, i.e., in a direction opposite to the moving direction of the pointer by the user and is displayed like the enlarged data 1601 shown in FIG. 16.

As described above, according to the second embodiment, when the pointer is moved downward, enlarged data is displayed on the upper side; when the pointer is moved leftward, enlarged data is displayed on the right side. Therefore, when the user moves the pointer in a direction of his or her interest, he or she can visually recognize program data in the moving direction. Even when enlarged data is displayed, program data in that direction can be confirmed more easily.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2005-230089, filed Aug. 8, 2005, which is hereby incorporated by reference herein in its entirety.

What is claimed is:

1. An information processing apparatus comprising:
a storage unit adapted to store a first object and a second object corresponding to the first object;
a first display unit adapted to display the first object;
a second display unit adapted to display the second object;
a designation unit adapted to designate an arbitrary position of an object using an index; and
a determination unit adapted to determine whether or not the position designated by the index on a screen falls within a display region of the first object while the second object is not displayed,
wherein when said determination unit determines that the designated position of the index by said designation unit has moved within the display region of the first object, said second display unit newly re-displays the second object to be superimposed on the first object at a position corresponding to the designated position of the index after movement and the display position of the first object.

2. The apparatus according to claim 1, wherein when the index is moved by said designation unit, and said determination unit determines that the designated position of the index falls outside the display region of the first object, said second display unit cancels display of the second object corresponding to the first object.

3. The apparatus according to claim 1, wherein said designation unit designates a position within the display region of the first object, which is occluded by the second object superimposed by said second display unit.

4. The apparatus according to claim 1, wherein when the second object partially falls outside the screen, said second display unit changes the display position of the second object to a position where the second object does not partially fall outside the screen, and displays the second object.

5. The apparatus according to claim 1, further comprising a scroll display unit configured to scroll and display the screen which displays the first object displayed by said first display unit and the second object displayed by said second display unit, when the second object displayed by said second display unit partially falls outside the screen.

6. The apparatus according to claim 1, wherein the first object is a thumbnail image, and the second object is an original image corresponding to the thumbnail image.

7. The apparatus according to claim 1, wherein the first object and the second object are text data, the first object includes partial text data of the text data, and the second object includes text data having characters of a number not less than the number of characters included in the first object.

8. The apparatus according to claim 1, wherein said second display unit displays the second object while continuously displaying change processes of a display position and a size from a display state of the first object to a final display state of the second object.

9. The apparatus according to claim 1, wherein said first display unit displays a list of a plurality of types of first objects on the screen,
said determination unit determines whether or not the index falls within a display range of any of the first objects, and
said second display unit displays a second object corresponding to the first object of the type determined by said determination unit.

10. The apparatus according to claim 1, wherein said second display unit displays the second object at a display position on the screen based on a relationship between a designated position of the index before movement and a designated position of the index after movement.

11. The apparatus according to claim 10, wherein when the index is moved by said designation unit, and said determination unit determines that the designated position of the index is moved to a different position within the display region of the first object, said second display unit changes the display position of the second object which is being displayed on the screen in a direction opposite to a moving direction of the index by said designation unit and re-displays the second object.

12. The apparatus according to claim 1, wherein the first object and the second object are individual program data which form an electronic program guide, the first object includes at least a program name, and the second object further includes detailed information of a program.

13. An information processing method for a display apparatus which stores a first object and a second object corresponding to the first object, and can superimpose the first object and the second object on a screen, comprising:
a first display step of displaying the first object;
a second display step of displaying the second object;
a designation step of designating an arbitrary position of an object using a index; and a determination step of determining whether or not the position designated by the index on a screen falls within a display region of the first object while the second object is not displayed, wherein the second display step includes: newly re-displaying, when it is determined in the determination step that the designated position of the index has moved within the display region of the first object, the second object to be superimposed on the first object at a position corresponding to the designated position of the index after movement and the display position of the first object.

14. A program encoded in a computer-readable medium for execution by a computer to cause a display apparatus, which stores a first object and a second object corresponding to the first object, and which can superimpose the first object and the second object on a screen, to perform the following procedures:

a first display procedure of displaying the first object;

a second display procedure of displaying the second object;

a designation procedure of designating an arbitrary position of an object using an index; and a determination procedure of determining whether or not the position designated by the index on a screen falls within a display region of the first object while the second object is not displayed, wherein the second display procedure includes: newly re-displaying, when it is determined in the determination procedure that the designated position of the index has moved within the display region of the first object, the second object to be superimposed on the first object at a position corresponding to the designated position of the index after movement and the display position of the first object.

* * * * *